(12) United States Patent  
Ito et al.

(10) Patent No.: US 6,563,275 B2
(45) Date of Patent: May 13, 2003

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/076,146

(22) Filed: Feb. 14, 2002

(65) Prior Publication Data

US 2002/0125835 A1 Sep. 12, 2002

(30) Foreign Application Priority Data

Feb. 14, 2001 (JP) ....................................... 2001-036960

(51) Int. Cl.[7] .............................................. H05B 37/02
(52) U.S. Cl. ....................................... 315/308; 315/224
(58) Field of Search ................................. 315/224, 225, 315/209 R, 291, 307, 308, 244, 247

(56) References Cited

U.S. PATENT DOCUMENTS 6,163,115 A * 12/2000 Ishizuka ...................... 315/308
6,333,607 B1 * 12/2001 Yamamoto et al. ......... 315/307
6,489,732 B2 * 12/2002 Ito et al. ...................... 315/308

FOREIGN PATENT DOCUMENTS

| JP | 2001-006886 | 1/2001 |
| JP | 2001-006891 | 1/2001 |
| JP | 2001-257092 | 9/2001 |

* cited by examiner

*Primary Examiner*—Haissa Philogene
*Assistant Examiner*—Wilson Lee
(74) *Attorney, Agent, or Firm*—Fish & Richardson P.C.

(57) ABSTRACT

When alternately applying an output voltage of a DC—DC converting circuit 3 to one discharge lamp, an output voltage on a non-load side in outputs having positive and negative polarities which is not applied to the discharge lamp during the light-up of the discharge lamp is restricted to be equal to an output voltage on a side which is applied to the discharge lamp. Moreover, when supplying a power to two discharge lamps while alternately switching a polarity of an output voltage through the DC—DC converting circuit 3, an output voltage on a non-load side in the outputs having positive and negative polarities which is not applied to the discharge lamp is restricted to be equal to the output voltage on the side which is applied to the discharge lamp if one of the discharge lamps is lighted up or an instruction for light-up is given and the other discharge lamp is lighted out or an instruction for light-out is given.

14 Claims, 12 Drawing Sheets

DISCHARGE LAMP LIGHTING CIRCUIT

BACKGROUND OF THE INVENTION

The present invention relates to a technique for reducing a power loss and heat generation in a discharge lamp lighting circuit and for guaranteeing stable lighting control.

There has been known a lighting circuit for a discharge lamp (a metal halide lamp) comprising a DC—DC converting circuit, a DC-AC converting circuit and a starting circuit (a so-called starter circuit). Assuming that the number of discharge lamps is one, for example, there is a structure comprising a DC—DC converter, a half bridge type circuit (a circuit constituted to make a set of two semiconductor switching elements and to alternately carry out ON/OFF control) and a control circuit thereof. The output of the converter is controlled by the control of the switching element in the DC—DC converter and an AC output generated by the alternating operation of the switching element constituting the half bridge type circuit is supplied to the discharge lamp. The DC—DC converter includes a configuration in which a circuit portion corresponding to each polarity is provided (a voltage converting circuit corresponding to the polarity is completely isolated) in order to obtain output voltages having positive and negative polarities and a configuration in which outputs having both polarities can be obtained with one structure without isolating the circuit portion.

Moreover, in the case in which the number of the discharge lamps is two, there is a disadvantage in that the number of components and a cost cannot be reduced if respective lighting circuits corresponding to the discharge lamps are provided to light up the discharge lamp. Therefore, it is preferable that the lighting circuits for two discharge lamps are made common. For example, there is a structure comprising a DC—DC converter and a full bridge type circuit (a circuit constituted to have four semiconductor switching elements in pairs and to alternately carry out ON/OFF control for two pairs of elements) and a control circuit thereof. More specifically, the output of the converter is controlled by the control of the switching element in the DC—DC converter. In addition, when a rectangular wave-shaped output generated by the alternating operation of the switching element constituting the full bridge type circuit is to be supplied to the discharge lamp, an output having a positive polarity and an output having a negative polarity are alternately supplied to the discharge lamps (In other words, when the output having a positive polarity is applied to one of the discharge lamps, the output having a negative polarity is applied to the other discharge lamp). The DC—DC converter for obtaining output voltages having a positive polarity and a negative polarity includes the circuit structures having two configurations as described above.

In order to reliably light up the discharge lamp, it is preferable that a current auxiliary circuit including a capacitor should be provided in the subsequent stage of a DC—DC converter (for example, JP-A-9-223591). In the case in which the discharge lamp breaks down, the stored energy of the capacitor is supplied to the discharge lamp so that a transition to an arc discharge can be carried out smoothly.

FIG. 12 schematically shows a voltage (the output of the DC—DC converter, an upper part indicating a voltage having a positive polarity, a lower part indicating a voltage having a negative polarity and a current "IL" in a middle stage indicating the current of the discharge lamp) which is supplied when one discharge lamp is lighted up on the assumption of a lighting circuit for the discharge lamp. The current auxiliary circuit is provided for the output having a positive polarity of the DC—DC converter, and a voltage output from the converter (a so-called open circuit voltage "O.C.V") is set to 350 V (volts), a limitation for the output having a negative polarity of the DC—DC converter is set to 150 V and a rated voltage of the discharge lamp is set to 85 V.

Assuming that the output having a positive polarity is applied to the discharge lamp in a certain timing, the output having a negative polarity has no path through which a current flows and is set in a non-load state. At this time, therefore, the voltage (magnitude) of the output having a negative polarity through the DC—DC converter is limited to 150 V.

When the polarity is inverted in a next timing and the output having a negative polarity is applied to the discharge lamp, the output having a positive polarity has no path through which a current flows and is set in a non-load state at this time. In this case, therefore, the voltage (magnitude) of the output having a positive polarity through the DC—DC converter is set to 350 V.

The operation described above is repeated according to the operating frequency of a bridge circuit (a frequency at which the switching operation of the switching element is alternated) so that an output having each polarity is supplied to the discharge lamp.

With the structure described above, however, the following drawbacks might be caused, for example.

(1) The influence of an AC component (based on a pulsating flow) with a low lighting frequency hinders constant power control;
(2) An increase in an invalid power component; and
(3) An increase in a loss in a current auxiliary circuit.

As shown in FIG. 12, the current "IL" flowing to the discharge lamp takes a waveform having a pulsating flow.

The reason is that a smoothing circuit is provided in the output stage of the DC—DC converter and electric charges accumulated in a smoothing capacitor are mainly discharged in a non-load state. In other words, the energy of the smoothing capacitor which is stored to have a voltage of approximately 350 V or −150 V is discharged to the discharge lamp to have a voltage of 85 V or −85 V during the polarity inversion of the bridge type circuit. Therefore, a current is increased immediately after the polarity inversion and the pulsating flow causes a great fluctuation in an output voltage, resulting in bad effects (1) to (3).

First of all, referring to the (1), the current to flow to the discharge lamp is temporarily increased without any control instruction instantaneously when the polarity of the discharge lamp is switched. Therefore, the control circuit tries to detect the increase to lessen the current flowing to the discharge lamp. However, when the capacity of the smoothing capacitor is large and the current is great during polarity switching, a higher power than a necessary control power is consequently applied. In order to avoid the application, for example, there is proposed a method of providing a delay (a delay circuit) in a circuit for detecting a value of a current flowing to a discharge lamp or a circuit for constant power control, thereby giving a response slowly. Consequently, a cost is increased. By slowly giving a response, moreover, there is a possibility that a power input (voltage) might be suddenly changed or a follow-up property for a change in the condition of the discharge lamp might be deteriorated. Thus, a possibility that the discharge lamp might go out is increased, which is not preferable.

Referring to the (2), moreover, description will be given with a specific numeric value. For example, when a rated power is set to 35 W, an electrostatic capacity of the smoothing capacitor is set to 0.47 $\mu$F and a lighting frequency of the bridge type circuit is set to 1 kHz, a DC—DC converter for an output having a positive polarity stores electric charges in the smoothing capacitor every 1 mS (millisecond) from 85 V (rated voltage) to 350 V (the O.C.V). An energy is "$0.47 \times 10^{-6} \times (350^2 - 85^2) = 0.054J$", which is a power per second of 0.054J×1000 (times)=54W. In order to set the power per second to a steady-state power of the discharge lamp or less, accordingly, it is preferable that the capacity of the smoothing capacitor or the lighting frequency should be regulated. As described above, a distorted AC component gives an invalid power component to generate a loss which is a burden to a heat radiation design.

Referring to the (3), the output voltage of the DC—DC converter is raised or dropped with the lighting frequency of the bridge type circuit. For example, therefore, in the case in which a resistance element is connected to the capacitor in the current auxiliary circuit, a Joule heat loss is generated by a current flowing to the resistance element.

In the above case, one discharge lamp is provided. Also in the case in which the number of the discharge lamps is two, the same bad effects are produced.

More specifically, in the case in which one of the discharge lamps is lighted up and the other discharge lamp is not lighted up, the output voltages of the DC—DC converter in the outputs having positive and negative polarities act in the same manner as in the case in which one discharge lamp is provided. When the output having a positive polarity (or a negative polarity) is applied to the discharge lamp which is lighted up, the negative electrode side (or the positive electrode side) is brought into a non-load state. Accordingly, in the case in which two discharge lamps are provided and one of the discharge lamps is not lighted up, the same problems as described above might arise.

SUMMARY OF THE INVENTION

The invention has an object to reduce a possibility of element failures caused by a power loss and heat generation and to implement stable power control in a discharge lamp lighting circuit.

In order to solve the problems described above, in the invention, when alternately applying an output voltage of a DC—DC converting circuit to one discharge lamp, an output voltage on a non-load side in outputs having positive and negative polarities which is not applied to the discharge lamp during light-up of the discharge lamp is restricted to be equal to an output voltage on a side which is applied to the discharge lamp. Moreover, when supplying a power to two discharge lamps while alternately switching a polarity of an output voltage through the DC—DC converting circuit, an output voltage on a non-load side in the output shaving positive and negative polarities which is not applied to the discharge lamp is restricted to be equal to the output voltage on the side which is applied to the discharge lamp if one of the discharge lamps is lighted up or an instruction for light-up is given to the discharge lamp and the other discharge lamp is not lighted up or the instruction for light-up is not given to the discharge lamp.

According to the invention, therefore, the output voltage on the non-load side is limited to the output voltage having a reverse polarity thereto. Consequently, it is possible to suppress an AC component through a pulsating flow related to a current flowing to the discharge lamp.

DETAILED DESCRIPTION OF THE PREFERRED EMBODIMENTS

Figure 1:
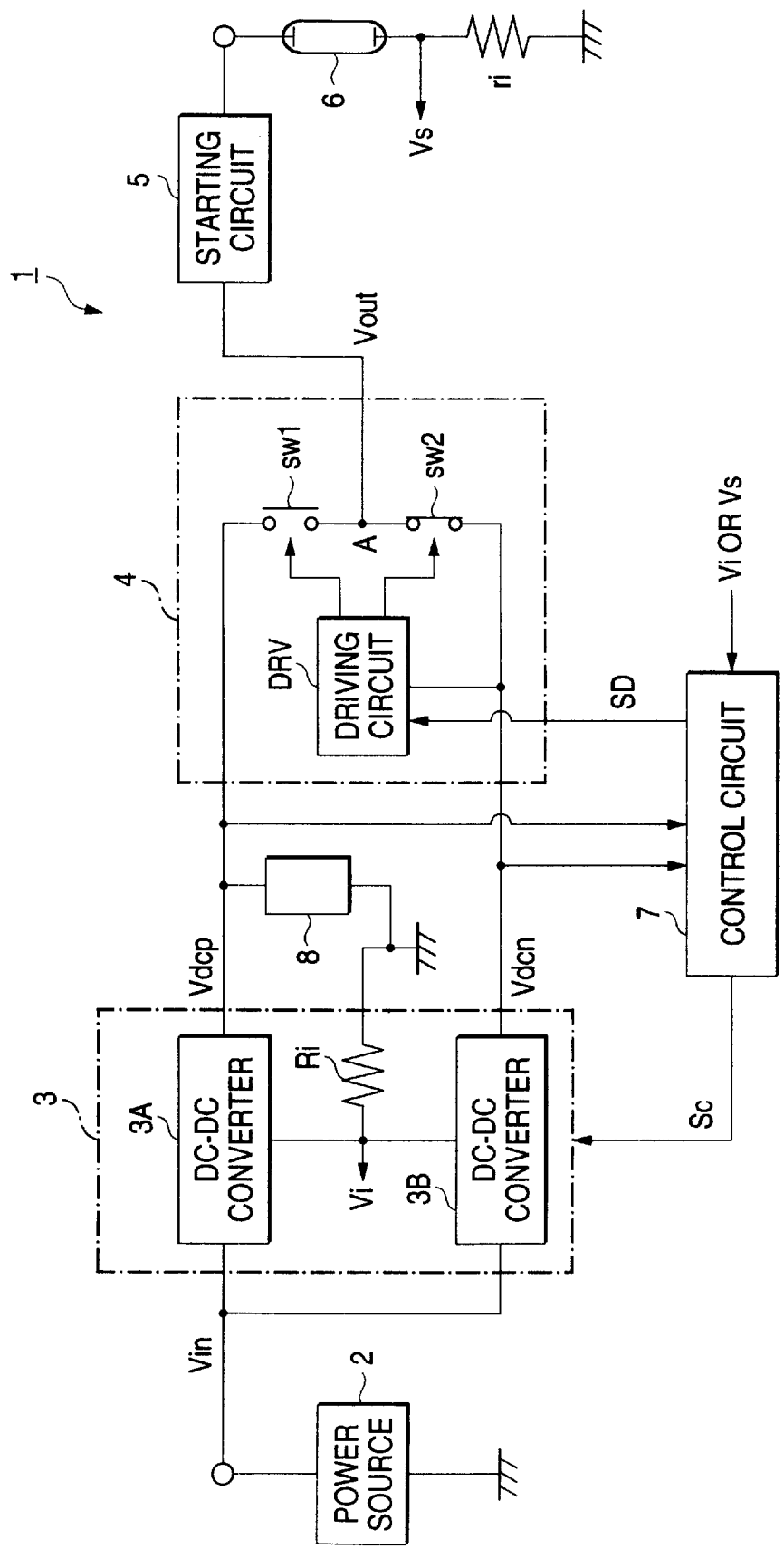
FIG. 1 is a circuit block diagram showing the basic structure of a discharge lamp lighting circuit according to the invention.

Referring to the case in which one discharge lamp is provided, first of all, the structure of a lighting circuit according to the invention will be described with reference to FIG. 1.

A discharge lamp lighting circuit 1 comprises a DC power source 2, a DC—DC converting circuit 3, a DC-AC converting circuit 4 and a starting circuit 5.

The DC—DC converting circuit 3 serves to obtain outputs having positive and negative polarities upon receipt of a DC input voltage (indicated as "Vin") which is applied from the power source 2, and has a transformer and a switching element in the circuit. In addition, the switching element is controlled in response to a signal sent from a control circuit 7 and an output voltage thereof is controlled. A DC—DC converter (a flyback type) having the structure of a switching regulator is used for the DC—DC converting circuit 3. As described above, there are a configuration of a non-isolation type in which circuits for obtaining both outputs having positive and negative polarities are not isolated from each other and a configuration of an isolation type in which output voltages having the polarities are separately output to individual circuits.

Figure 2:
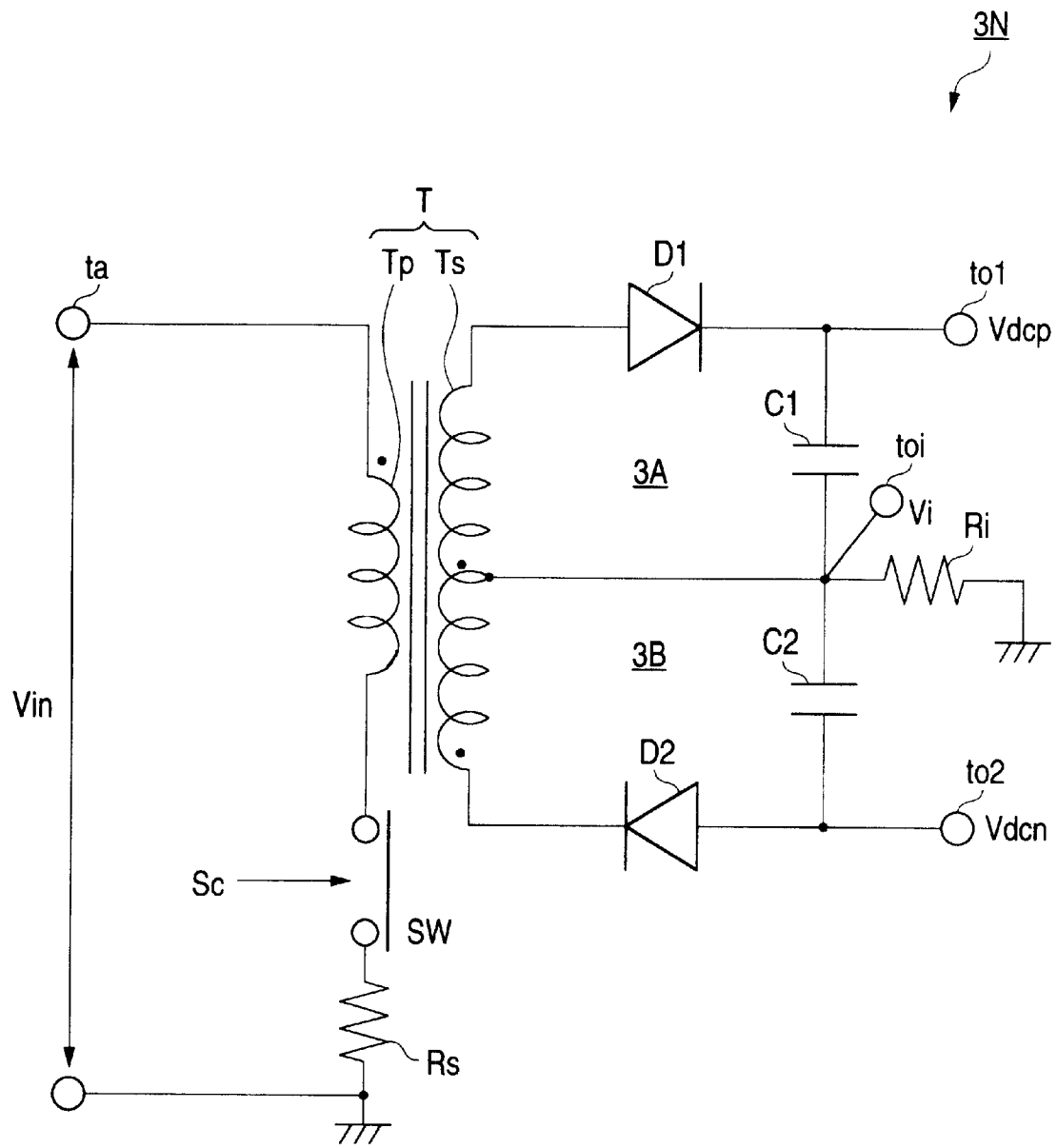
FIG. 2 is a circuit diagram showing an example of a circuit structure of a non-isolation type for a DC—DC converting circuit.
Figure 3:
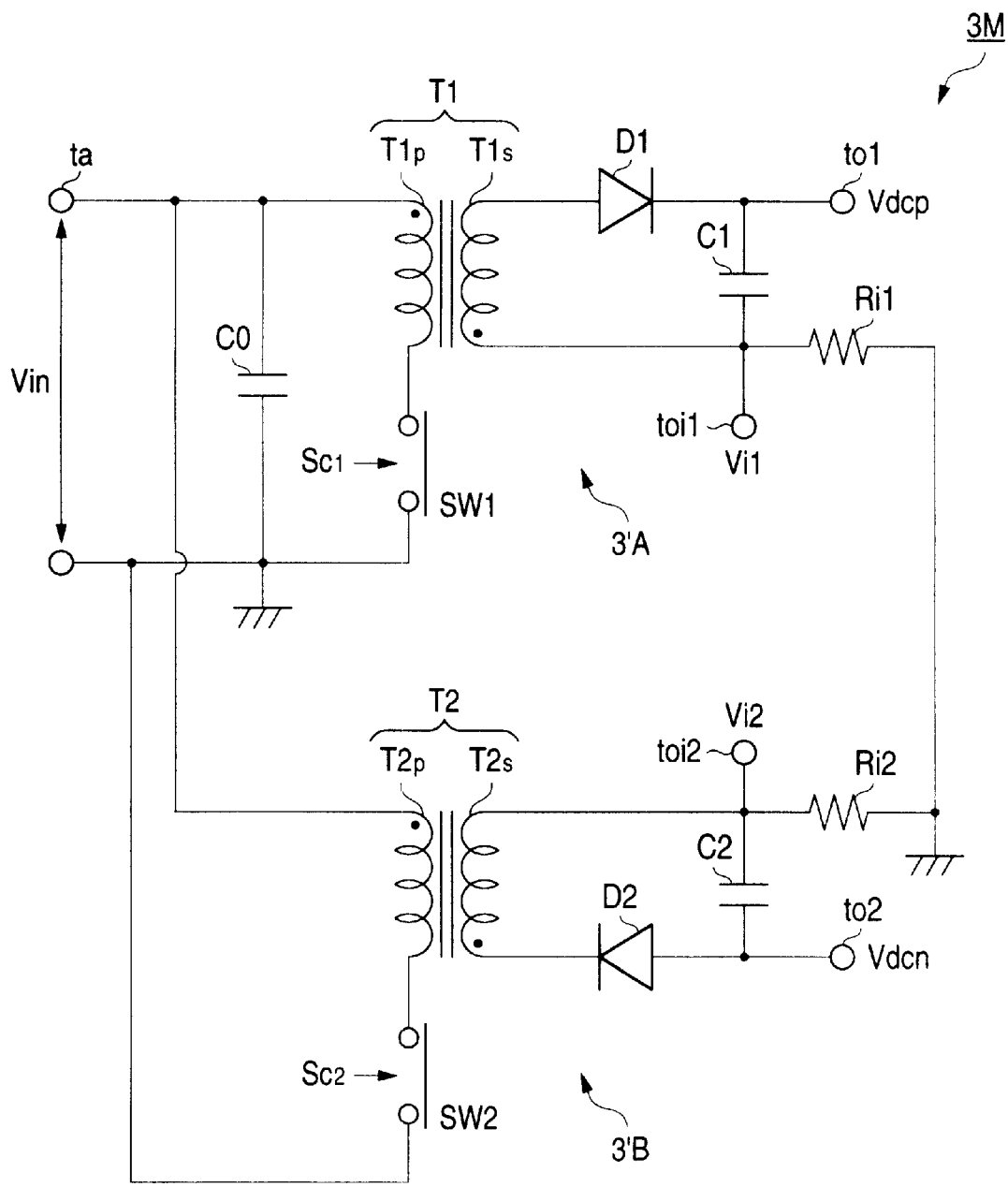
FIG. 3 is a circuit diagram showing an example of a circuit structure of an isolation type for the DC—DC converting circuit.

FIGS. 2 and 3 show examples of the structure of the DC—DC converting circuit. Two circuits 3A and 3B are provided on the secondary side in FIG. 2 and separate circuits 3'A and 3'B are provided on primary and secondary sides in FIG. 3.

FIG. 2 shows a structure example 3N of a non-isolation type in which one of ends of a primary winding Tp of a transformer T is connected to a DC input terminal "ta" so that a voltage Vin is input and the other end of the primary winding Tp is grounded through a semiconductor switching element SW (which is simply indicated as a mark of a switch in the drawing and for which an FET (a field effect transistor) is used) and a resistor Rs for current detection (the resistor Rs is optional and does not particularly need to be provided). A signal "Sc" is supplied from the control circuit 7 to a control terminal (a gate in the FET) of the semiconductor switching element SW where switching control thereof is carried out.

A secondary winding Ts of the transformer T has one of ends connected to an anode of a diode D1, and a cathode of the diode D1 is connected to one of ends of a capacitor C1 and is connected to a terminal "to1" from which an output voltage (indicated as "Vdcp") is obtained. The other end of the capacitor C1 is connected to a center tap of the secondary winding Ts and is grounded through a resistor Ri.

The other end of the secondary winding Ts is connected to a cathode of a diode D2 and an anode of the diode D2 is connected to a capacitor C2 and a terminal "to2" from which an output voltage (indicated as "Vdcn") is obtained through the terminal.

The resistor Ri is a current detecting element for obtaining a detection signal (an equivalent signal) related to a current flowing to a discharge lamp 6 and serves to detect a current by converting a current flowing to the resistor into a voltage. A detecting terminal "toi" is connected to a node of the resistor Ri and the capacitors C1 and C2, from which a detection signal "Vi" is generated.

As described above, the DC—DC converting circuit 3N has such a structure that voltages Vdcp and Vdcn having positive and negative polarities are separately output from the two output terminals "to1" and "to2".

A mark " • " attached to the winding of the transformer T indicates a winding start and the mark " • " is added to a connecting end with the diode D2 and a winding start end in the center tap for the secondary winding Ts respectively, for example. Moreover, the capacitors C1 and C2 constitute a smoothing circuit and are equivalent to capacitors described with reference to FIG. 12.

FIG. 3 shows an example of the configuration of the isolation type. A DC—DC converting circuit 3M has two transformers T1 (a primary winding T1p and a secondary winding T1s) and T2 (a primary winding T2p and a secondary winding T2s).

One of terminals of the primary windings T1p and T2p of the transformers is connected to the DC input terminal ta and the other terminal is grounded through the switching elements SW1 and SW2 (for which a semiconductor switching element is used and which is simply indicated as a mark of as witch in the drawing), respectively. These switching elements SW1 and SW2 are separately ON/OFF controlled in response to control signals Sc1 and Sc2 sent from the control circuit 7 so that each secondary output can be variably controlled independently.

A capacitor C0 provided in parallel with the primary windings T1p and T2p has one of ends connected to the DC input terminal ta and the other end grounded.

The circuit 3'A includes the transformer T1 and the switching element SW1, the rectifying diode D1 and the smoothing capacitor C1 which are connected to the secondary winding T1s, and a resistor Ri1 for current detection. In other words, the secondary winding T1s has one of ends connected to the anode of the diode D1, and the cathode of the diode D1 is connected to the output terminal to1 and one of the ends of the capacitor C1. The other end of the capacitor C1 is connected to a terminal on the winding start end side of the secondary winding T1s and is grounded through the resistor Ri1 for current detection.

In such a circuit, accordingly, a current flowing to the primary winding T1p of the transformer T1 is controlled by the ON/OFF control of the switching element SW1 based on the control signal Sc1, and a voltage Vdcp having a positive polarity is applied from the secondary winding T1s to the output terminal to1 through the diode D1 and the capacitor C1. A terminal "toi1" is a current detecting terminal connected to a node of the capacitor C1 and the resistor Ri1 for current detection, and a detection signal "Vi1" is generated from the same terminal.

On the other hand, the circuit 3'B includes the transformer T2 and the switching element SW2, the rectifying diode D2 and the smoothing capacitor C2 which are connected to the secondary winding T2s, and a resistor Ri2 for current detection. In other words, the secondary winding T2s has one of ends (a terminal on the winding start end side) connected to the cathode of the diode D2, and the anode of the diode D2 is connected to the output terminal to2 and one of the ends of the capacitor C2. The other end of the capacitor C2 is connected to a terminal on the termination side of the secondary winding T2s and is grounded through the resistor Ri2 for current detection.

In such a circuit, accordingly, a current flowing to the primary winding T2p of the transformer T2 is controlled by the ON/OFF control of the switching element SW2 based on the control signal Sc2, and a voltage Vdcn is applied from the secondary winding T2s to the output terminal to2 through the diode D2 and the capacitor C2. A terminal "toi2" is a current detecting terminal connected to a node of the capacitor C2 and the resistor Ri2 for current detection, and a detection signal "Vi2" is generated from the same terminal.

A current auxiliary circuit 8 (see FIG. 1) provided in the output stage of the DC—DC converting circuit 3 serves to aid to supply an energy stored in a capacitive element (capacitor) provided in the same circuit to the discharge lamp 6 when starting the discharge lamp 6, thereby reliably carrying out a transition from a glow discharge to an arc discharge. While the current auxiliary circuit is provided on the positive polarity output side in FIG. 1, the reason is that the polarity of a voltage to be supplied to the discharge lamp 6 is to be defined to have a positive electrode before starting the discharge lamp 6 (that is, in the case in which the polarity of the supplied voltage is defined to be negative, it is preferable that the current auxiliary circuit should be additionally provided on the negative electrode side).

Figure 4A:
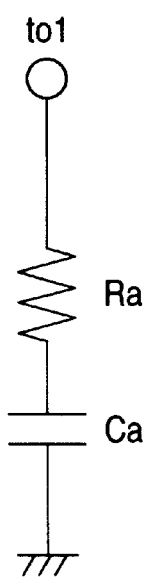
FIGS. 4a–c are diagrams showing examples of the structure of a current auxiliary circuit.
Figure 4B:
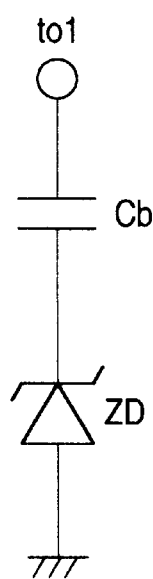
Figure 4C:
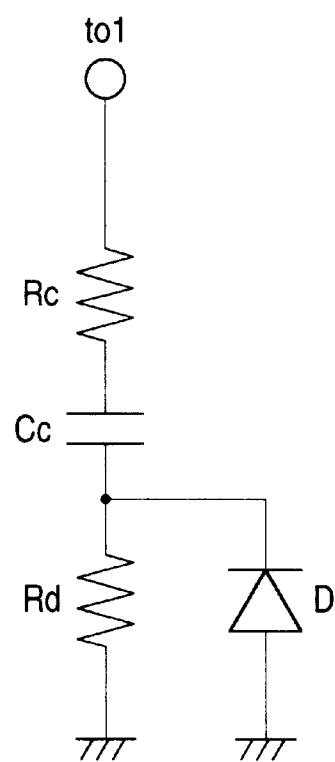

FIGS. 4A to 4C show some structure examples of the current auxiliary circuit 8.

In the structure shown in FIG. 4A, a resistor Ra and a capacitor Ca form a series circuit, and the resistor Ra has one of ends connected to the output terminal to1 and the other end grounded through the capacitor Ca.

In the structure shown in FIG. 4B, moreover, a capacitor Cb and a Zener diode ZD form a series circuit, the capacitor Cb has one of ends connected to the output terminal to1 and the other end connected to a cathode of the Zener diode ZD, and an anode of the Zener diode ZD is grounded.

In the structure shown in FIG. 4C, a resistor Rc has one of ends connected to the output terminal to1 and the other end grounded through a series circuit of a capacitor Cc and a resistor Rd, and a diode D is connected in parallel with the resistor Rd (The diode D has a cathode connected between the capacitor Cc and the resistor Rd and an anode grounded).

The DC-AC converting circuit 4 (see FIG. 1) in the subsequent stage of the DC—DC converting circuit 3 is provided to covert the output voltage of the DC—DC converting circuit 3 into an AC voltage and to then supply the AC voltage to the discharge lamp 6, and voltages having positive and negative polarities are separately sent from two output terminals of the DC—DC converting circuit 3 respectively. In order to switch the output voltage Vdcp of the circuit section (converter) 3A or 3'A and the output voltage Vdcn of the circuit section (converter) 3B or 3'B, a pair of semiconductor switching elements sw1 and sw2 provided in the DC-AC converting circuit 4 (for which a field effect transistor is used and which is simply indicated as a mark of a switch in the drawing) carry out an alternating operation through a driving circuit DRV thereof and an AC voltage thus generated is supplied to the discharge lamp 6.

More specifically, referring to the two switching elements sw1 and sw2 connected in series in the output stage of the DC—DC converting circuit 3, the element sw1 is connected to the output terminal of the circuit 3A and to the output terminal of the circuit 3B through the element sw2 in the example of the drawing. Referring to the driving circuit DRV for reciprocally controlling the switching operation of the switching elements, for example, a known IC (integrated circuit) is used as a half bridge driver. In other words, the alternating operation of the half bridge is carried out such that the element sw2 is brought into an OFF state when the element sw1 is set in an ON state and the element sw2 is brought into the ON state when the element sw1 is set in the OFF state in response to a signal supplied to the control terminal of each switching element from the driving circuit DRV, and a DC voltage is thus converted into an AC voltage.

Figure 5:
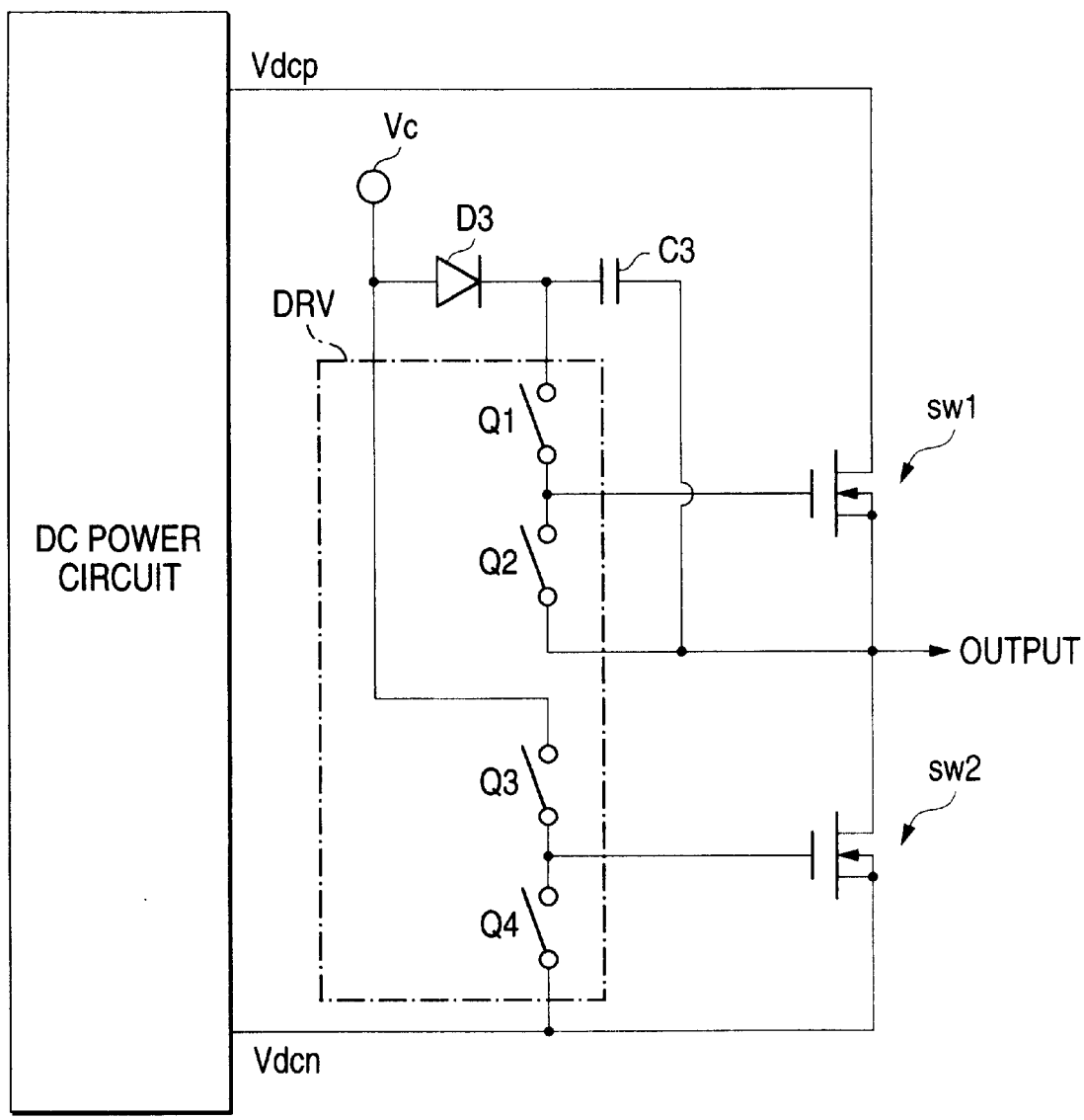
FIG. 5 is a diagram for explaining the structure of a driving circuit of a bootstrap type.

FIG. 5 shows an example of the structure of a bootstrap type as a driving circuit in the case in which a field effect transistor is used for the elements sw1 and sw2 (a DC power circuit in the drawing includes the DC power source 2 and the DC—DC converting circuit 3).

In FIG. 5, the switching element in an IC for driving is equivalently indicated as a mark of a switch and there are provided a series circuit of two elements Q1 and Q2 and a series circuit of two elements Q3 and Q4.

A power is supplied from a power terminal Vc to the elements Q1 to Q4 and is supplied from the power terminal Vc to the elements Q1 and Q2 through a diode D3, and furthermore, the power is exactly supplied from the power terminal Vc to the elements Q3 and Q4. In other words, a cathode of the diode D3 is connected to a node of N channels FETs sw1 and sw2 through a capacitor C3 and is connected to the element Q1. A node of the elements Q1 and Q2 is connected to a gate of the FET sw1 and a terminal of the element Q2 on the opposite side of the node of the elements Q1 and Q2 is connected to the node of the FETs sw1 and sw2.

On the other hand, referring to the elements Q3 and Q4, one of ends of the element Q3 is connected to the power terminal Vc and a node of both terminals is connected to a gate of the FET sw2, and a terminal of the element Q4 on the opposite side of a node of the elements Q3 and Q4 is connected to (a source of) the FET sw2.

It is a matter of course that the elements Q1 to Q4 are controlled in response to a control signal sent from the control circuit 7 to the driving IC, respectively.

In order to turn ON the FET sw1 positioned in the upper part of the drawing in the circuit, for example, it is necessary to once charge the capacitor C3 from the power terminal Vc through the diode D3 and store electric charges and to turn ON the same FET by using the electric charges (The element Q1 is brought into an ON state and the element Q2 is brought into an OFF state. At this time, it is preferable that the element Q3 should be brought into the OFF state and the element Q4 should be brought into the ON state in order to bring the lower FET into the OFF state.).

The starting circuit 5 (see FIG. 1) is provided to generate a high voltage signal (a starting pulse) for starting the discharge lamp 6 and to start the discharge lamp 6. The starting signal is superposed on an AC voltage "Vout" output from the DC-AC converting circuit 4 and is applied to the discharge lamp 6. In other words, the starting circuit 5 includes an inductive component (an inductance component of a secondary winding of a trigger transformer, and the discharge lamp 6 has one of electrode terminals connected to a node A of the two switching elements sw1 and sw2 through the inductive component and the other electrode terminal grounded (GND) or grounded through a resistor "ri" for current detection (in the case in which the resistor for current detection shown in FIGS. 2 and 3 is not provided) ("Vs" in FIG. 1 indicates a current detection signal.)

For a detecting circuit for detecting a current flowing to the discharge lamp 6, for example, there is provided a current detecting circuit for detecting a value of a current flowing to the discharge lamp by using the resistor "Ri" or "ri" for current detection. For a voltage detecting circuit for detecting a voltage applied to the discharge lamp, moreover, a circuit for detecting an output voltage by using a voltage dividing resistor as is well known can be provided to generate detection signals for output voltages (Vdcp, Vdcn), for example.

The control circuit 7 (see FIG. 1) controls a power to be applied to the discharge lamp upon receipt of a detection signal of a voltage applied to the discharge lamp and a current flowing to the discharge lamp and controls the output of the DC—DC converting circuit 3. More specifically, the control circuit 7 is provided for controlling a power supplied corresponding to the state of the discharge lamp 6 and sends a control signal (Sc) to the DC—DC converting circuit 3, thereby controlling these output voltages. Moreover, the control circuit 7 sends a control signal (SD) to the driving circuit DRV, thereby controlling the polarity switching of a bridge. The control circuit 7 also serves to raise a voltage to be supplied to the discharge lamp 6 to a certain level before the discharge lamp 6 is lighted up, thereby carrying out output control for reliably lighting up the discharge lamp 6.

When the output voltage of the DC—DC converting circuit 3 is to be alternately applied to the discharge lamp 6, a voltage (350 V, −150 V) on the non-load side and a pulsating flow for the smoothing capacitor or the capacitor of the current auxiliary circuit are generated as described with reference to FIG. 12. In order to prevent a bad effect from being produced by the generation, it is effective that the output voltage on the non-load side in the outputs having positive and negative polarities which is not applied to the discharge lamp is restricted to be equal to the output voltage on the side which is applied to the discharge lamp during the light-up of the discharge lamp.

Figure 6:
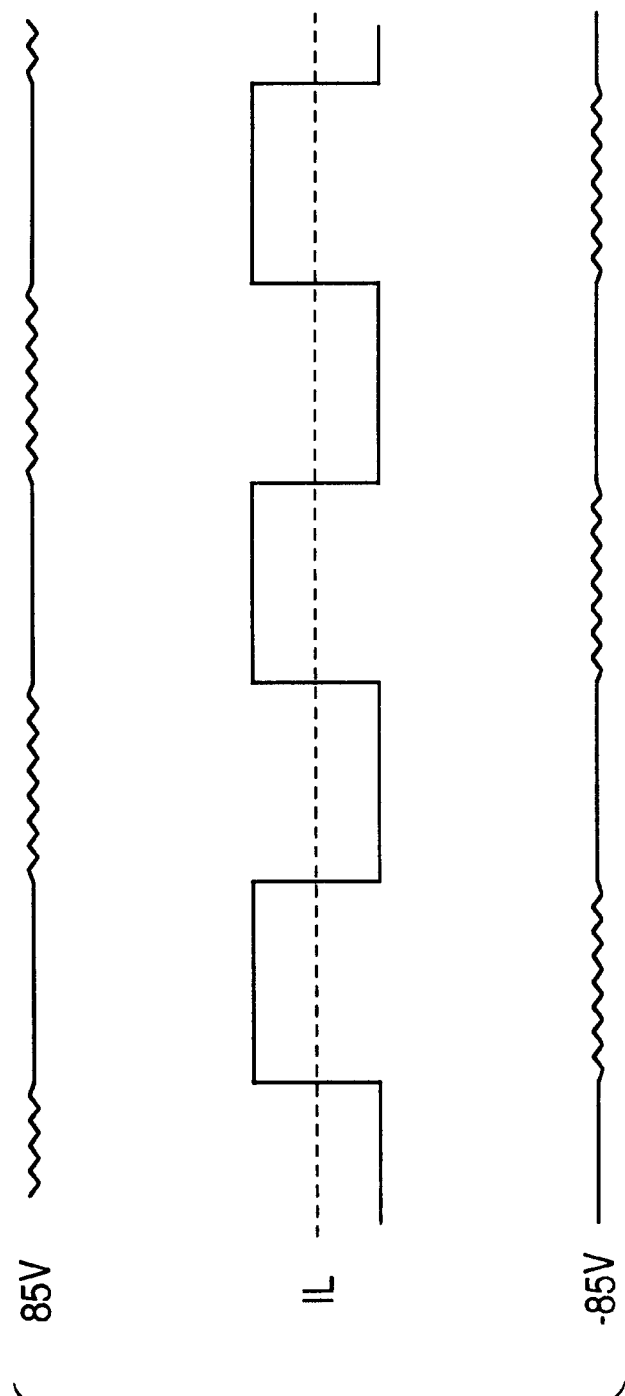
FIG. 6 is a diagram for explaining a voltage restriction in a non-load state according to the invention.
Figure 12:
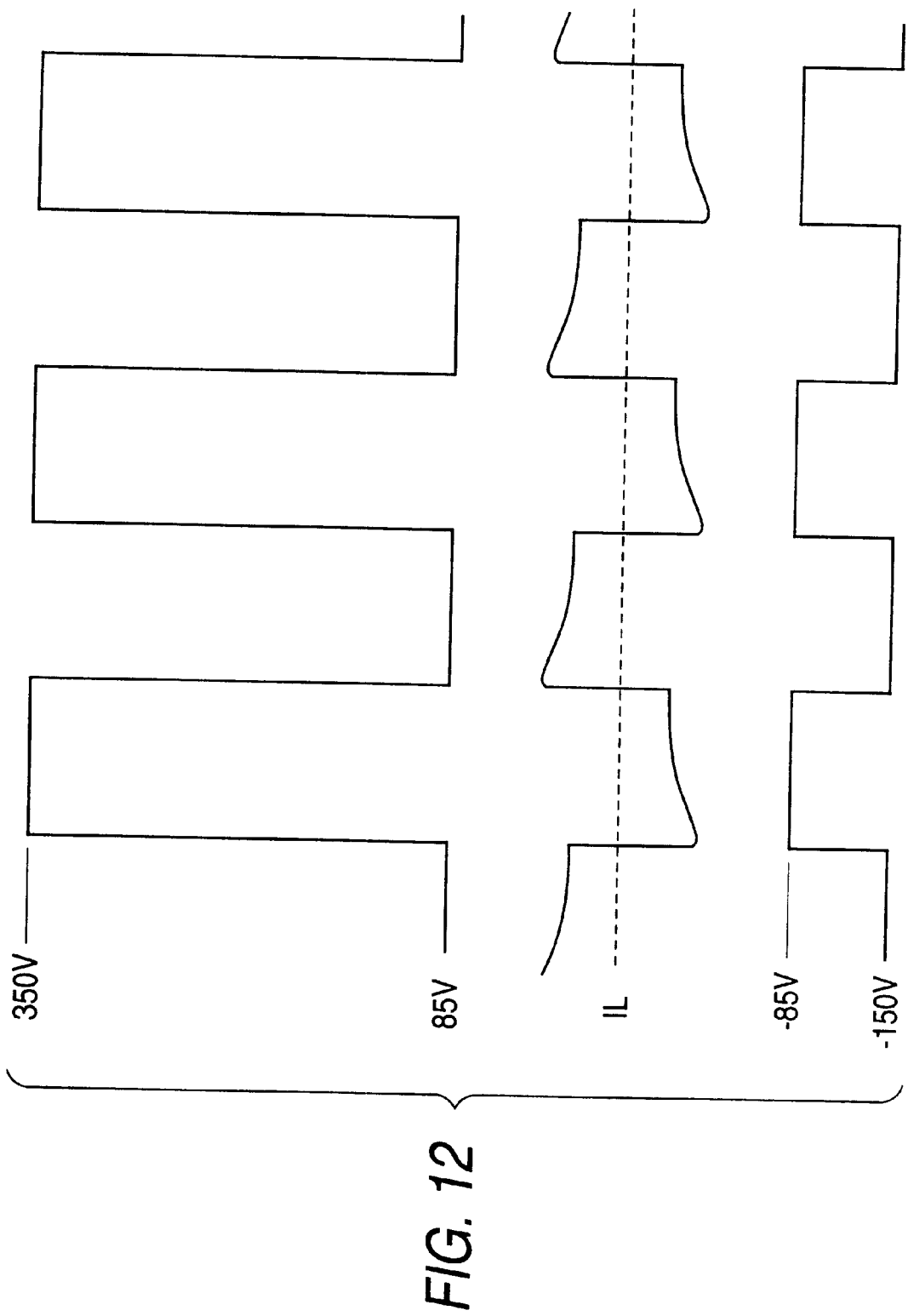
FIG. 12 is a diagram for explaining a conventional problem.

FIG. 6 schematically shows the state corresponding to FIG. 12.

Referring to the output voltage of the DC—DC converting circuit 3, an upper part shows a voltage having a positive polarity and a lower part shows a voltage having a negative polarity. In any case of the embodiment, a magnitude (an absolute value) is limited to 85 V (an applied voltage) in the non-load state. For example, when a voltage having a positive polarity of "85 V" is applied to the discharge lamp, a voltage restriction to "−85 V" is carried out on the negative electrode side. Moreover, when a voltage having a negative polarity of "−85 V" is applied to the discharge lamp, a voltage restriction to "85 V" is carried out on the positive electrode side. As a result, the current IL flowing to the discharge lamp 6 takes the shape of a clear rectangular wave having no AC component. Therefore, it is possible to avoid the bad effects of (1) to (3) (This is the same as in the control of two discharge lamps which will be described later).

Figure 7:
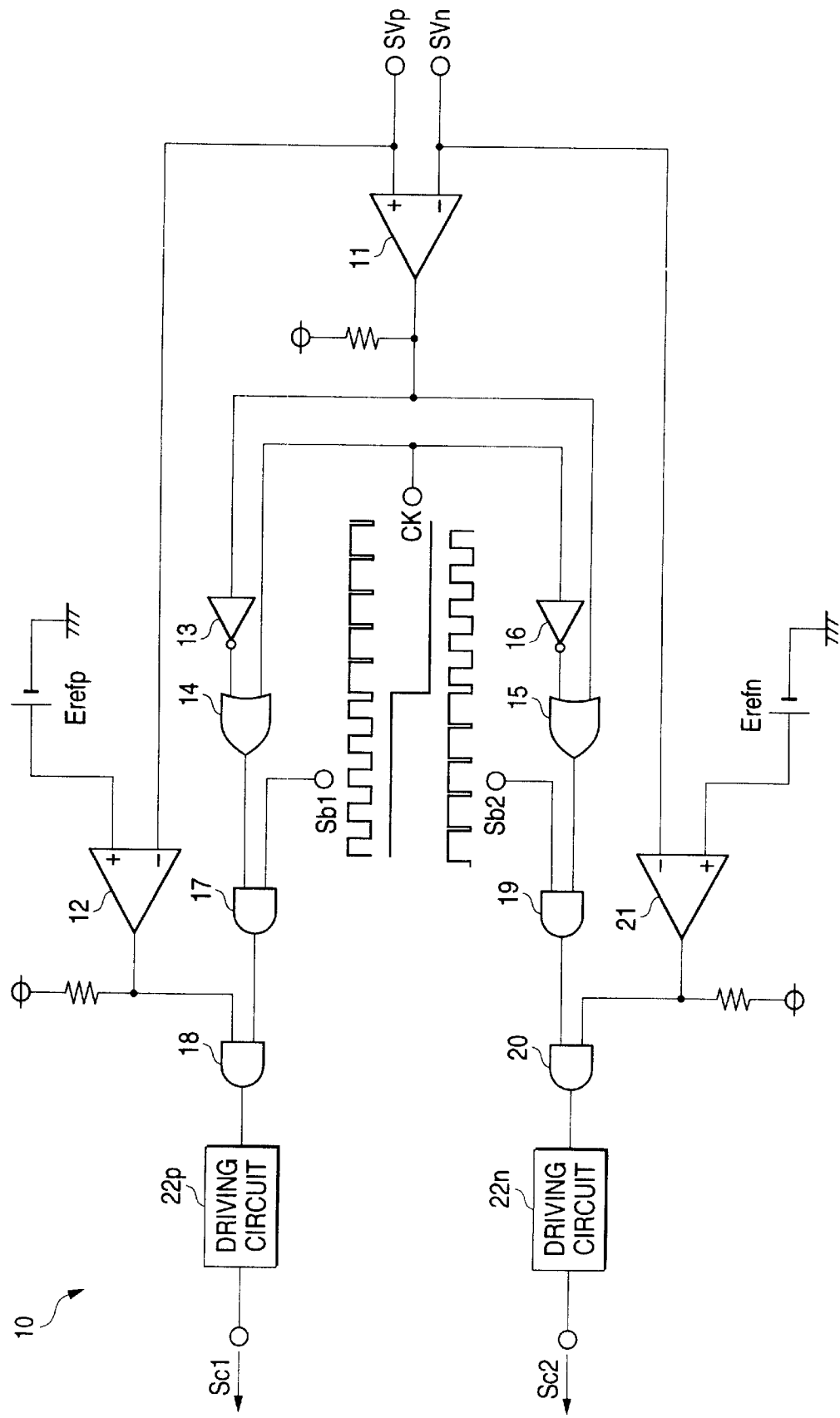
FIG. 7 is a circuit diagram showing an example of the structure of the main part of a control circuit.

FIG. 7 shows a structure example 10 of the main part of the control circuit 7. The structure example 3M in FIG. 3 is used for the DC—DC converting circuit.

Each mark in the drawing has the following meaning.

"SVp" is a detection signal (detection voltage) related to the output voltage having a positive polarity of the DC—DC converting circuit, "SVn" is a detection signal (detection voltage) related to the output voltage having a negative polarity of the DC—DC converting circuit, "CK" is a signal indicative of the polarity of a voltage to be applied to the discharge lamp (which is indicative of a positive polarity with an H level and a negative polarity with an L level), "Sb1" is a control signal to be sent to a driving circuit 22p of the switching element SW1 of the circuit 3'A by a circuit (not shown) for the power control of the discharge lamp (which is a basic signal of Sc1, that is, a signal for positive electrode driving), and "Sb2" is a control signal to be sent to a driving circuit 22n of the switching element SW1 of the circuit 3'B by a circuit (not shown) for the power control of the discharge lamp (which is a basic signal of Sc2, that is, a signal for negative electrode driving).

Since it is sufficient that a known detecting method using a resistance voltage division for the Vdcp and the Vdcn is employed for detecting the voltages applied to the SVp and the SVn, the description of a circuit structure will be omitted. Referring to a circuit for power control, moreover, there has been well known such a circuit configuration that the level of an operation signal based on a voltage detection signal or a current detection signal of a discharge lamp is compared with that of a sawtooth wave depending on a control method (PWM:pulse width modulation, PFM:pulse frequency modulation), for example, thereby generating a signal having a duty cycle defined to control the ON/OFF state of a switching element, and any power control method is used for the invention. Therefore, the description of circuits for generating the Sb1 and the Sb2 will be omitted (for example, see JP-A-4-12495 and JP-A-2001-6891).

Figure 8:
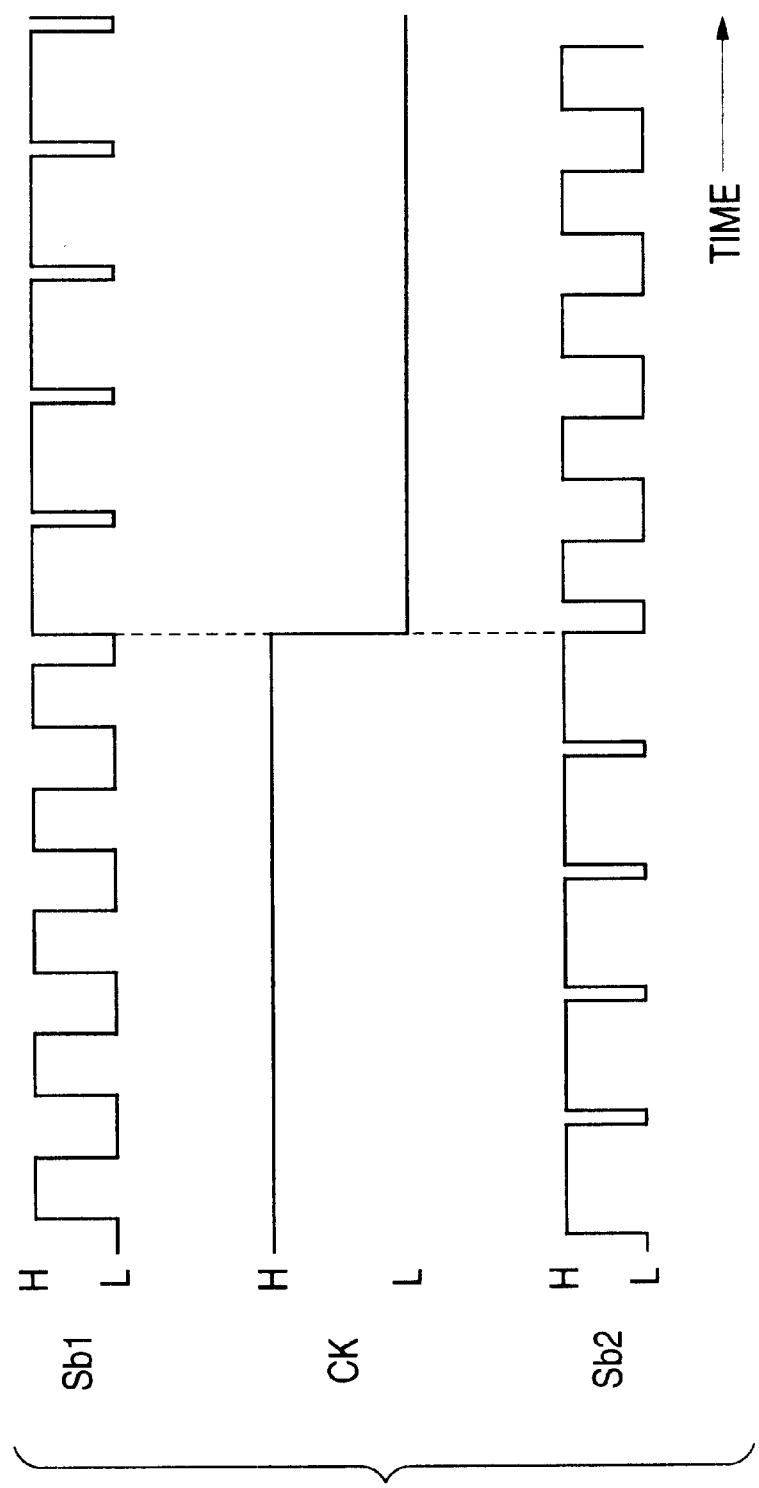
FIG. 8 is a timing chart showing the phase relationship between signals.

The relationship between the signal CK and the signals Sb1 and Sb2 is shown in FIG. 8.

The positive polarity voltage detection signal SVp is supplied to the positive input terminal of a comparator 11 and is supplied to the negative input terminal of a comparator 12.

The output signal of the comparator 11 branches into two portions, one of which is supplied to one of input terminals of a 2-input OR (logical sum) gate 14 through a NOT (logical negation) gate 13. The signal CK is supplied to the other input terminal of the OR gate 14.

Moreover, the other branching portion of the output signal of the comparator 11 is exactly supplied to one of input terminals of a 2-input OR gate 15. The signal CK is supplied to the other input terminal of the OR gate 15 through a NOT gate 16.

The output signal of the OR gate 14 and the signal Sb1 are supplied to a 2-input AND (logical product) gate 17 and the output signal of the 2-input AND gate 17 is supplied to one of input terminals of the 2-input AND gate 18.

The output signal of the comparator 12 is supplied to the other input terminal of the AND gate 18. The comparator 12 is provided for specifying a maximum value (or an upper limited value) for a voltage output having a positive polarity, and serves to compare SVp supplied as a negative input with a reference voltage supplied as a positive input (which is indicated as a mark of a constant voltage source, that is, "Erefp" in the drawing and corresponds to the "350 V") and to output an L level signal when the SVp exceeds the Erefp.

The output signal of the OR gate 15 and the signal Sb2 are supplied to a 2-input AND (logical product) gate 19 and the output signal of the 2-input AND gate 19 is supplied to one of input terminals of a 2-input AND gate 20.

The output signal of a comparator 21 is supplied to the other input terminal of the AND gate 20. The comparator 21 is provided for specifying a maximum value (or a lower limited value of a voltage value having a sign in consideration of the direction of a voltage) for a voltage output (a magnitude) having a negative polarity, and serves to compare SVn supplied as a negative input with a reference voltage supplied as a positive input (which is indicated as a mark of a constant voltage source, that is, "Erefn" in the drawing and corresponds to the "−150 V") and to output an L level signal when the SVn exceeds the Erefn.

The output signal of the AND gate 18 is sent as the control signal Sc1 to the switching element SW1 of the circuit (converter) 3'A for an output having a positive polarity through the driving circuit 22p for positive electrode driving. Moreover, the output signal of the AND gate 20 is sent as the control signal Sc2 to the switching element SW2 of the circuit (converter) 3'B for an output having a negative polarity through the driving circuit 22n for negative electrode driving. These driving circuits include a circuit for voltage level conversion which is required for driving the switching element.

In the circuit, when the signal CK has an H level, the output signal of the OR gate 14 has the H level. Therefore, the signal Sb1 for positive electrode driving passes by the AND gate 17 and is supplied to the AND gate 18. At this time, in the case in which the output signal of the comparator 12 has the H level, the output signal of the AND gate 18 (which is the same as the output signal of the AND gate 17) becomes Sc1 through the driving circuit 22p. In other words, the duty cycle of the ON/OFF control of the switching element SW1 is defined by the signal Sb1. Moreover, when the signal CK has the L level, a non-load state is brought and a load current does not flow. Therefore, the signal Sb1 becomes a signal having a maximum duty cycle (depending on control to cause a current to flow in a larger amount).

On the other hand, the signal CK having the L level is logically inverted by the NOT gate 16 so that the output signal of the OR gate 15 has the H level. Therefore, the signal Sb2 for negative electrode driving passes by the AND gate 19 and is supplied to the AND gate 20. At this time, in the case in which the output signal of the comparator 21 has the H level, the output signal of the AND gate 20 (which is the same as the output signal of the AND gate 19) becomes Sc2 through the driving circuit 22n. In other words, the duty cycle of the ON/OFF control of the switching element SW1 is defined by the signal Sb2. When the signal CK has the H level, a non-load state is brought so that a load current does not flow. Therefore, the signal Sb2 has a maximum duty cycle.

Thus, while both the signals Sb1 and Sb2 have maximum duty cycles in the non-load state, a maximum voltage is limited by the comparators 12 and 21. For example, if the level of the SVp is high to exceed the Erefp, the comparator 12 sends an L level signal to the AND gate 18 (the output signal of the AND gate 17 is disregarded) and does not accept the Sb1 so that the output signal of the gate 18 is forcibly set to have the L level. Similarly, when the magnitude of the SVn exceeds the Erefn (the direction of a voltage is not considered), the comparator 21 sends the L level signal to the AND gate 20 (the output signal of the AND gate 19 is disregarded) and does not accept the Sb2 so that the output signal of the gate 20 is forcibly set to have the L level. Thus, the comparators 12 and 21 serve to inhibit each driving signal. In an operation to be carried out in the non-load state, accordingly, when the output voltage of the converter (3'A, 3'B) is raised in response to a driving signal in a maximum duty cycle to reach a limited voltage thereof, the operation of the converter is stopped. Consequently, when the output voltage is reduced, a boosting operation is started again. Thus, an intermittent operation is repeated.

The control described above corresponds to the contents explained with reference to FIG. 12.

The main points of the invention will be described below.

The comparator 11 constitutes comparing means for comparing the magnitude of a positive electrode voltage with that of a negative electrode voltage and compares SVp with SVn, and outputs an H level signal with "SVp>SVn" and outputs an L level signal if not so ("SVp<SVn").

When the signal CK has the L level, that is, the positive electrode side is set in the non-load state, the output signal of the OR gate 14 is an H signal if the output signal of the comparator 11 has the L level. Consequently, a driving signal having a maximum duty cycle is obtained as Sb1 and a signal Sc1 based thereon is sent to the switching element SW1. Moreover, in the case in which the output signal of the comparator 11 has the H level during the non-load (on the positive electrode side), the output signal of the OR gate 14 has the L level and the output signal of the AND gate 17 has the L level. Therefore, a control signal based on the driving signal Sb1 is not sent to the switching element SW1. More specifically, a voltage output having a positive polarity is limited so as not to exceed a voltage having a negative polarity (a negative electrode voltage) in a timing of the non-load (on the positive electrode side).

This is the same as in the case in which the negative electrode side is set in the non-load state (the signal CK has the H level). In the case in which the output signal of the comparator 11 has the L level, the output signal of the OR gate 15 has the L level and the output signal of the AND gate 19 has the L level. Therefore, a control signal based on the driving signal Sb2 is not sent to the switching element SW2. More specifically, a voltage output having a negative polarity is limited so as not to exceed a voltage having a positive polarity (a positive electrode voltage) in a timing of the non-load (on the negative electrode side).

FIG. 6 shows a voltage output state with a non-load in a zigzag line.

Thus, a voltage restriction is applied by a voltage having one of polarities in the non-load state of the other polarity. Therefore, it is possible to reduce the waste caused by the power loss. Moreover, an additional circuit such as a delay is not required for the power control. Therefore, a bad effect can be prevented from being caused by a deterioration in a control response.

Figure 9:
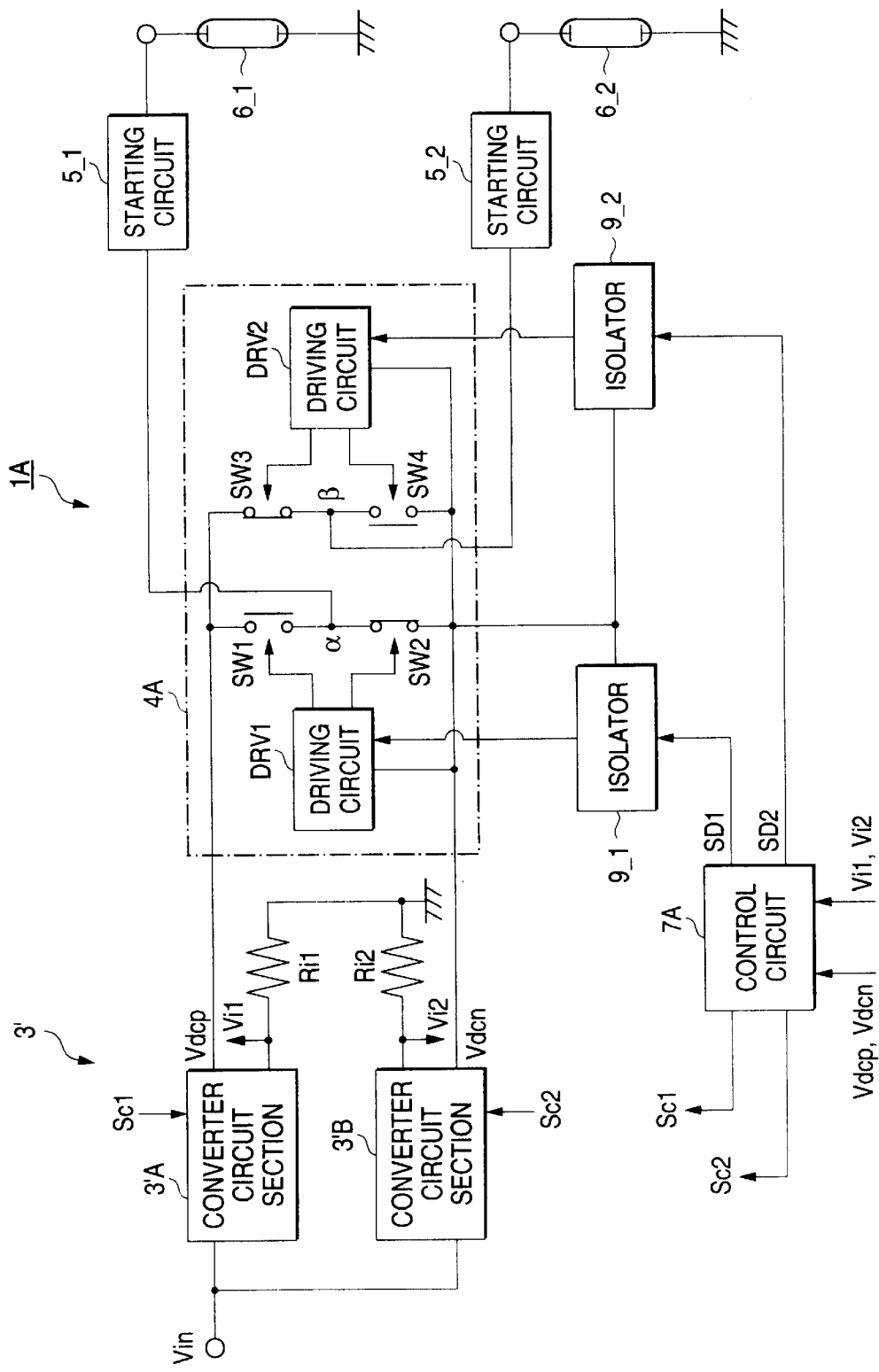
FIG. 9 is a diagram showing an example of a circuit structure in the case in which two discharge lamps are lighted up.

In order to extend the circuit of FIG. 1 to a circuit for lighting control related to two discharge lamps, for example, the structure shown in FIG. 3 is used as a DC—DC converting circuit for obtaining DC outputs having positive and negative polarities and a DC-AC converting circuit 4A having a circuit structure of a full bridge type (or an H bridge type) using four semiconductor switching elements is employed as in a lighting circuit 1A shown in FIG. 9.

In the drawing, referring to switching elements sw1 and sw2 making a first set which are connected to each other in series, the switching element sw1 has one of ends connected to the output terminal of the circuit 3'A and the other end connected to the output terminal of the circuit 3'B through the switching element sw2. A first discharge lamp 6_1 is connected to a node α of both switching elements through (an inductive load component in) a starting circuit 5_1.

Moreover, referring to switching elements sw3 and sw4 making a second set which are connected to each other in series, the switching element sw3 has one of ends connected to the output terminal of the circuit 3'A and the other end connected to the output terminal of the circuit 3'B through the switching element sw4. A second discharge lamp 6_2 is connected to a node β of both switching elements through (an inductive load component in) a starting circuit 5_2.

All of the electrode terminals in the discharge lamps 6_1 and 6_2 which are not connected to the nodes α and β are grounded. In the case in which the resistors Ri1 and Ri2 for current detection are not used, it is preferable to employ such a structure that one of ends of each discharge lamp is grounded through an alternative resistor for detection (corresponding to "ri" in FIG. 1), thereby sending the detection signal of each resistor to a control circuit 7A.

An IC for a half bridge driver is used for both of the driving circuits DRV1 and DRV2 and defines the polarity of a bridge upon receipt of a signal sent from the control circuit 7A.

In the DC-AC converting circuit 4A having a plurality of switching elements sw1 to sw4, the driving circuit DRV1 serves to carry out the ON/OFF control of the switching elements sw1 and sw2 and the driving circuit DRV2 serves to carry out the ON/OFF control of the switching elements sw3 and sw4. Assuming that the state of each element is defined such that the switching element sw1 is brought into an ON state (or an OFF state) and the switching element sw2 is brought into the OFF state (or the ON state) by the driving circuit DRV1 at a certain time, the state of each element is defined such that the switching element sw3 is brought into the OFF state (or the ON state) and the switching element sw4 is brought into the ON state (or the OFF state) by the driving circuit DRV2 at this time. In other words, the switching elements sw1 and sw4 are brought into the same state and the switching elements sw2 and sw3 are brought into the same state, and they reciprocally carry out an alternating operation.

By the ON/OFF operation of two sets of switching elements, accordingly, a voltage output having a negative polarity is applied to the second discharge lamp 6_2 while a voltage output having a positive polarity is applied to the first discharge lamp 6_1, for example, (To the contrary, the output having a positive polarity is applied to the second discharge lamp 6_2 while the output having a negative polarity is applied to the first discharge lamp 6_1.).

The control signals (indicated as "SD1" and "SD2") are sent from the control circuit 7A to the driving circuits DRV1 and DRV2 through isolators 9_1 and 9_2, respectively. More specifically, in the example shown in FIG. 9, a low potential side voltage in each driving circuit is set to be an output voltage applied from the circuit 3'B for an output having a negative polarity. Therefore, the H (high) level and the L (low) level are defined for the output voltage, and furthermore, an isolation is required for carrying out the ON/OFF control of the switching elements sw1 to sw4 upon receipt of the control signal (a binary status signal). As a matter of course, if the IC for a bridge driver having an isolating function is used for each driving circuit, it is preferable that the control signal should be directly input to each driving circuit.

It is apparent that two discharge lamps are set in the same condition as that in the case of one discharge lamp in a state in which one of the discharge lamps is lighted up (or a state in which an instruction for light-up is given) and a state in which the other discharge lamp is not lighted up (or a state in which an instruction for light-out is given) (because a non-load state is set for an output having a polarity to which a power is not applied). Accordingly, the voltage restriction is preferably carried out such that the output voltage on the non-load side in the outputs having positive and negative polarities which is not applied to the discharge lamp is equal to the output voltage on the side which is applied to the discharge lamp.

Figure 10:
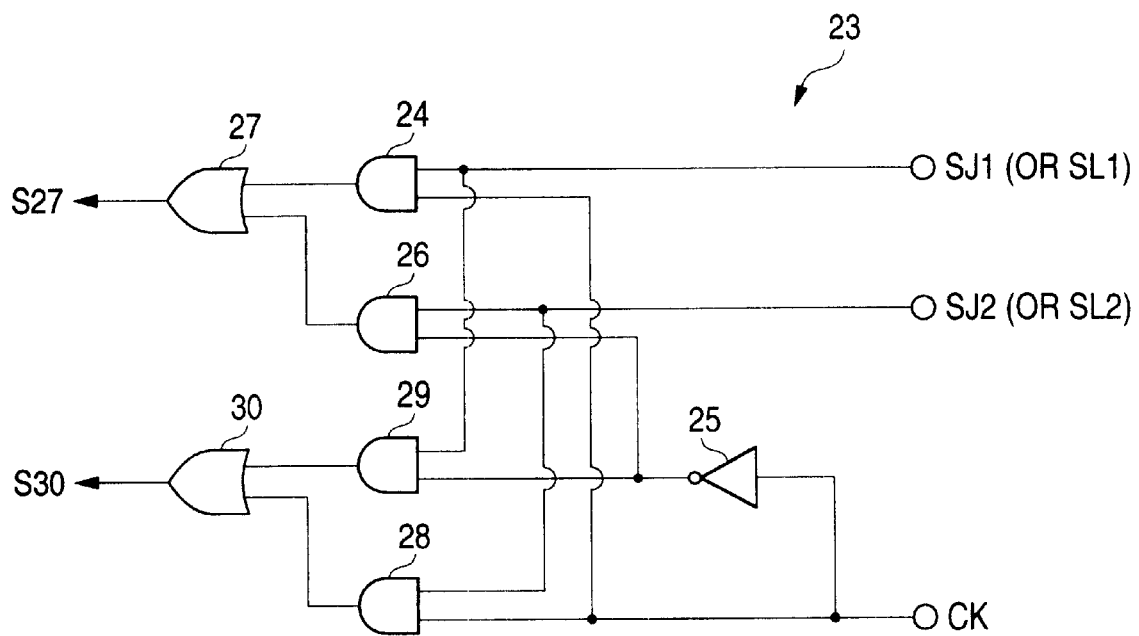
FIG. 10 is a diagram showing an example of the structure of the main part of the control circuit together with FIG. 11, illustrating a logical circuit section for receiving a lighting signal, a lighting indicating signal and a polarity switching signal in the discharge lamp.
Figure 11:
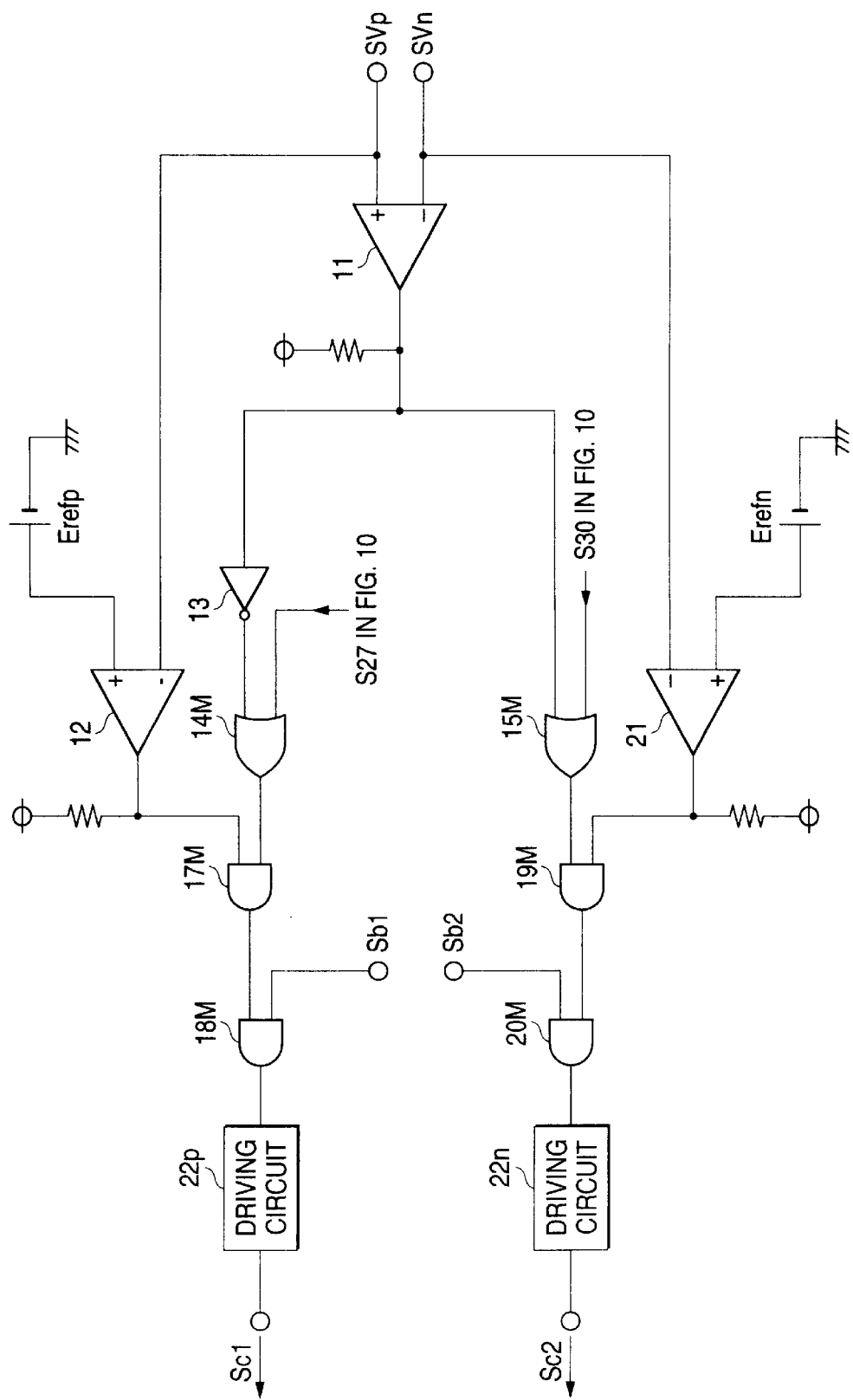
FIG. 11 is a circuit diagram showing the main part of a circuit related to the driving control of a switching element.

FIGS. 10 and 11 show structure examples for the main part of the control circuit 7A, and designations in the drawings have the following meaning.

"SJ1" is a status decision signal indicating whether or not the first discharge lamp 6_1 is lighted up (indicating the H level with light-up and the L level with light-out), "SJ2" is a status decision signal indicating whether or not the second discharge lamp 6_2 is lighted up (indicating the H level with the light-up and the L level with the light-out), "SL1" is a light-up indicating signal for the first discharge lamp 6_1 (the H level with the indication of light-up and the L level with the indication of light-out), "SL2" is a light-up indicating signal for the second discharge lamp 6_2 (the H level with the indication of the light-up and the L level with the indication of the light-out), and "CK" is a signal indicative of the H level when an output having a positive polarity is applied to the first discharge lamp 6_1 or when an output having a negative polarity is applied to the second discharge lamp 6_2 and indicative of the L level in the reverse case, that is, when the output having a negative polarity is applied to the first discharge lamp 6_1 or when the output having a positive polarity is applied to the second discharge lamp 6_2 (if the number of discharge lamps is reduced to one, the signal becomes equal to the signal "CK").

The status deciding circuit of the discharge lamp includes various configurations such as a circuit for detecting a current flowing to the discharge lamp and comparing the current with a threshold and a circuit for detecting the amount of light of the discharge lamp by using an optical sensor, thereby deciding light-up/out. Moreover, the light-up indicating signal can easily be obtained from a lighting switch for each discharge lamp or a lighting switching circuit based on the same switch.

Since the circuit having the same structure as that in FIG. 7 is used except for a part in the example of the structure, only a difference therebetween will be described below. In the following description, it is assumed that the signals SJ1, SJ2 and CK are used. Moreover, a difference in the input-output signal relationship will be clearly described by adding a mark of "M" behind the used designation.

There is provided a logical circuit section 23 including four 2-input AND gates, two 2-input OR gates and one NOT gate for the signals SJ1, SJ2 and CK. More specifically, the signal SJ1 and the signal CK are input to an AND gate 24, the signal SJ2 and an inversion signal of the CK which is obtained from a NOT gate 25 are input to an AND gate 26 and output signals of the AND gates 24 and 26 are supplied to an OR gate 27. Then, an output signal (indicated as "S27") of the OR gate 27 is supplied to one of input terminals of an OR gate 14M in FIG. 11. Moreover, the signals SJ2 and CK are input to an AND gate 28, the signal SJ1 and the inversion signal of the CK which is obtained from the NOT gate 25 are input to an AND gate 29, and output signals of the AND gates 28 and 29 are supplied to an OR gate 30. An output signal (indicated as "S30") of the OR gate 30 is supplied to one of input terminals of an OR gate 15M in FIG. 11.

The output signal S27 of the OR gate 27 and a signal sent from the comparator 11 through the NOT gate 13 are supplied to the OR gate 14M and an output signal of the OR gate 14M is supplied to one of input terminals of an AND gate 17M. The output signal of the comparator 12 is supplied to the other input terminal of the AND gate 17M, an output signal of the AND gate 17M is supplied to one of input terminals of an AND gate 18M, and the AND gate 18M gains a logical product signal of the output signal of the AND gate 17M and the signal Sb1 and sends the logical product signal to the driving circuit 22p.

The output signal S30 of the OR gate 30 and the output signal of the comparator 11 are supplied to the OR gate 15M and an output signal of the OR gate 15M is supplied to one of input terminals of an AND gate 19M. The output signal of the comparator 21 is supplied to the other input terminal of the AND gate 19M, an output signal of the AND gate 19M is supplied to one of input terminals of an AND gate 20M, and the AND gate 20M gains a logical product signal of the output signal of the AND gate 19M and the signal Sb2 and sends the logical product signal to the driving circuit 22n.

In the circuit, when the SVp and the SVn reach the reference voltages Erefp and Erefn specified therefor, the outputs of the comparators 12 and 21 are set to have the L level. Therefore, it is apparent that the output signals of the AND gates 17M and 19M are set to have the L level and the driving operation for the switching elements (SW1, SW2) is stopped.

The circuit section 23 serves to output the H level in such a polarity timing as to drive the lighted discharge lamp. Assuming that the first discharge lamp 6_1 is lighted up and the second discharge lamp 6_2 is lighted out, for example, the SJ1 has the H level so that the output signal of the AND gate 24 is set to have the H level and is output through the OR gate 27 when the CK has the H level (In other words, the signal CK is output to the OR gate 27.). At this time, the output signal of the AND gate 28 has the L level and the output signal of the AND gate 29 has the L level so that the output signal of the OR gate 30 has the L level. In other words, in the case in which the CK has the H level, an H level signal is supplied to the OR gate 14M on the positive electrode driving side and an L level signal is supplied to the OR gate 15M on the negative electrode driving side.

On the other hand, when the CK has the L level, the output signals of the AND gates 24 and 26 have the L level so that the output signal of the OR gate 27 has the L level. Moreover, the output signal of the AND gate 29 has the H level so that the output signal of the OR gate 30 is set to have the H level. In other words, in the case in which the CK has the L level, the L level signal is supplied to the OR gate 14M on the positive electrode driving side and the H level signal is supplied to the OR gate 15M on the negative electrode driving side.

Accordingly, when the H level signal is input to the OR gate 14M (the CK has the H level), the output signal of the same gate is set to have the H level. Therefore, in the case in which the output signal of the comparator 12 has the H level (in other words, in the case in which a positive electrode voltage restriction with the voltage Erefp is not applied), the H level signal output from the AND gate 17M is supplied to the AND gate 18M so that the signal Sb1 is exactly supplied to the driving circuit 22p (the driving control of the switching element SW1 is carried out in accordance with the duty cycle of the same signal). Moreover, when the L level signal is input to the OR gate 14M (the CK has the L level), the output of the same gate is determined by a logical negation signal of the output signal of the comparator 11. In other words, in the case in which the output signal of the comparator 11 has the H level (or the L level), the output signal of the OR gate 14M has the L level (or the H level). For example, in the case of SVp>SVn, the output signal of the comparator 11 has the H level. Therefore, the output signal of the OR gate 14M is set to have the L level in response to the logical negation signal. As a result, the AND gate 18M prevents the Sb1 from passing therethrough (a driving stop state is brought by the L level signal output from the AND gate 17). Moreover, in the case of SVp<SVn, the output signal of the comparator 11 has the L level and the output signal of the OR gate 14M has the H level in response to the logical negation signal. As a result, the output signal of the AND gate 17M is set to have the H level as long as the output signal of the comparator 12 does not have the L level. Consequently, the Sb1 exactly passes through the AND gate 18M and is sent to the driving circuit 22p so that the restriction is not applied.

Thus, in the case in which the discharge lamp 6_1 is lighted up and the discharge lamp 6_2 is lighted out, the driving signal Sb1 is exactly sent to the switching element of the DC—DC converting circuit through the driving circuit 22p with such a polarity as to apply a positive polarity output to the discharge lamp 6_1 (the CK has the H level) so that the operation of the same circuit is controlled. In the case of a reverse polarity, that is, with a polarity for applying a negative polarity output to the discharge lamp 6_1 (the CK has the L level), a voltage restriction is applied such that the SVp does not exceed the SVn (the restriction is carried out with a negative electrode voltage having a reverse polarity).

In the case in which the SJ1 has the H level and the SJ2 has the L level, the logical negation signal of the CK is output to the OR gate 30. Therefore, when the output signal of the OR gate 30 has the H level, the signal Sb2 is sent to the driving circuit 22n through the AND gate 20M as long as the output signal of the comparator 21 has the H level. When the output signal of the OR gate 30 has the L level and the output of the comparator 11 has the L level (SVp<SVn), the output signals of the AND gates 19M and 20M are set to have the L level so that the voltage restriction is applied in the same manner as described above by the driving stop of the switching element.

Apparently from the symmetry of the circuit structure, the contents described above are the same also when the positions of both discharge lamps are reversed, that is, the discharge lamp 6_2 is lighted up and the discharge lamp 6_1 is lighted out (it is a matter of course that the SJ1 is set to have the L level and the SJ2 is set to have the H level to follow the flow of a signal in the same manner as described above, and the signal CK is sent to the OR gate 30 of the circuit section 23 and the logical negation signal of the signal CK is sent to the OR gate 27.).

Moreover, in the case in which both of the two discharge lamps are lighted up, Sc1 and Sc2 based on the signals Sb1 and Sb2 are sent to the switching elements (SW1 and SW2 in FIG. 3) constituting a circuit section (a converter) having each polarity forming the DC—DC converting circuit (3') and driving control is thereby carried out. In other words, since both the SJ1 and the SJ2 have the H level, both of the output signals of the OR gates 27 and 30 are set to have the H level.

In the case in which both of the discharge lamps are lighted out, both of the output signals of the OR gates 27 and 30 have the L level. Therefore, the driving signals Sb1 and Sb2 having the polarities are restricted to voltages having polarities reverse to each other. More specifically, the voltages having both polarities are restricted to the reference voltage Erefp or Erefn which is lower. For example, in the case in which the current auxiliary circuit 8 is used, it is impossible to apply a restriction by setting different voltage values to a polarity on the side where the same circuit is additionally provided and a reverse polarity thereto. For example, moreover, when the discharge lamp 6_1 is lighted up and the discharge lamp 6_2 is to be lighted up in such a state that the discharge lamp 2 is lighted out, there is caused a drawback, for example, a voltage to be supplied to the discharge lamp 6_2 is restricted by a voltage to be supplied to the discharge lamp 6_1.

In order to eliminate such a drawback, SL1 is used in place of the SJ1 and SL2 is used in place of the SJ2 in FIG. 10. In other words, it is preferable that the output signal of the circuit section 23 should not be determined depending on whether or not each discharge lamp is lighted up but whether or not an instruction for light-up is given to each discharge lamp. When both of the SL1 and SL2 have the L level, both discharge lamps are not lighted up. In this case, therefore, the lighting circuit does not need to be operated and can be removed (It is preferable to consider only the case in which the SL1 or the SL2 has the H level or both of them have the H level. Accordingly, it is sufficient that the signals SJ1 and SJ2 are replaced with the SL1 and the SL2 in the above description for the circuit operation, respectively.).

The replacement of such signals implies that the concept of "a period in which the discharge lamp is not lighted up" does not include the operation state set before the discharge lamp is lighted up, that is, a period in which an indicating signal for lighting up the discharge lamp is given and the discharge lamp is actually lighted up is not regarded as "a period in which the discharge lamp is not lighted up". The light-up indicating signals SL1 and SL2 of the discharge lamp indicate constant status values in an operation before the light-up of the discharge lamp as well as during the light-up of the discharge lamp (the signals have the H level as long as an instruction for light-up is given in the example). Accordingly, even if the discharge lamp is actually lighted out, the signals SL1 and SL2 have the H level as long as the instruction for light-up is given. Therefore, at least one of both signals is set to have the H level. For example, in the case in which the discharge lamp 6_1 is lighted up (the SL1 has the H level) and the discharge lamp 6_2 is lighted out (the SL2 has the L level) and is to be lighted up, the lighting signal SL2 is set to have the H level and each switching element is controlled based on the driving signals Sb1 and Sb2. In that case, a voltage restriction based on the L level signal of each of the comparators 12 and 21 acts on each driving signal. Within the range of the restriction, a voltage raised to a necessary voltage (O.C.V) before the light-up in response to a driving signal in a maximum duty cycle can be supplied to the discharge lamp 6_2.

As is apparent from the above description, according to the first and second aspects of the invention, the pulsating flow related to the current flowing to the discharge lamp can be suppressed by restricting the output voltage on the non-load side by the output voltage having a reverse polarity. Therefore, it is possible to prevent constant power control from being inhibited by the influence of an AC component caused by the pulsating flow and to reduce waste such as an increase in a power loss or heat generation, thereby implementing stable power control.

What is claimed is:

1. A discharge lamp lighting circuit comprising:

a DC—DC converting circuit for converting a DC input voltage into a positive polarity output and a negative polarity output, the DC—DC converting circuit including a transformer and a switching element and a current auxiliary circuit having a capacitor to aid light-up of the discharge lamp;

a DC-AC converting circuit for converting an output voltage of the DC—DC converting circuit into an AC voltage by an alternating operation of a plurality of switching elements and then supplying the AC voltage to the discharge lamp; and a control circuit for controlling a power to be applied to the discharge lamp upon receipt of a detection signal for a voltage applied to the discharge lamp or a current flowing to the discharge lamp and for controlling an output of the DC—DC converting circuit, wherein when alternatively applying the output voltage of the DC—DC converting circuit to the discharge lamp, an output voltage on a non-load side in the outputs having positive and negative polarities which is not applied to the discharge lamp during the light-up of the discharge lamp is restricted to be equal to an output voltage on a side which is applied to the discharge lamp.

2. A discharge lamp lighting circuit as claimed in claim 1, wherein said current auxiliary circuit further includes a resistor serially connected with the capacitor, one end of the current auxiliary circuit being connected with the output of the DC—DC converting circuit while the other end being grounded.

3. A discharge lamp lighting circuit as claimed in claim 1, wherein said current auxiliary circuit further includes a zener diode serially connected with the capacitor, one end of the current auxiliary circuit being connected with the output of the DC—DC converting circuit while the other end being grounded.

4. A discharge lamp lighting circuit as claimed in claim 1, wherein said current auxiliary circuit further includes a resistor having one of ends connected to the output of the DC—DC converting circuit and the other end grounded through a series circuit of the capacitor and second resistor, and a diode connected in parallel with the second resistor.

5. A discharge lamp lighting circuit as claimed in claim 1, wherein one end of a primary winding of the transformer is connected to a DC input terminal of the DC—DC converting circuit to input an input voltage while the other end of the primary winding is grounded through the switching element, a control signal is supplied from the control circuit to a control terminal of the switching element.

6. A discharge lamp lighting circuit as claimed in claim 5, a resistor for current detection is provided between the ground and the switching element.

7. A discharge lamp lighting circuit as claimed in claim 1, wherein said DC—DC converting circuit has two transformers, one ends of primary windings of the two transformers are connected to a DC input terminal of the DC—DC converting circuit while the other ends of the primary windings are respectively grounded through the switching elements, control signals are respectively supplied from the control circuit to control terminals of the switching elements.

8. A discharge lamp lighting circuit comprising:

a DC—DC converting circuit for converting a DC input voltage into a positive polarity output and a negative polarity output, the DC—DC converting circuit including a transformer and a switching element and a current auxiliary circuit having a capacitor to aid light-up of the discharge lamp, a DC-AC converting circuit for converting an output voltage of the DC—DC converting circuit into an AC voltage by an alternating operation of a plurality of switching elements and then supplying the AC voltage to two discharge lamps; and a control circuit for controlling a power to be applied to the discharge lamp upon receipt of a detection signal for a voltage applied to each of the discharge lamps or a current flowing to each of the discharge lamps and for controlling an output of the DC—DC converting circuit, wherein when supplying a power to each of the discharge lamps while alternately switching a polarity of an output voltage through the DC—DC converting circuit, an output voltage on a non-load side in the outputs having positive and negative polarities which is not applied to the discharge lamp is restricted to be equal to an output voltage on a side which is applied to the discharge lamp if one of the discharge lamps is lighted up or an instruction for light-up is given to the discharge lamp and the other discharge lamp is not lighted up or the instruction for light-up is not given to the discharge lamp.

9. A discharge lamp lighting circuit as claimed in claim 8, wherein said current auxiliary circuit further includes a resistor serially connected with the capacitor, one end of the current auxiliary circuit being connected with the output of the DC—DC converting circuit while the other end being grounded.

10. A discharge lamp lighting circuit as claimed in claim 8, wherein said current auxiliary circuit further includes a zener diode serially connected with the capacitor, one end of the current auxiliary circuit being connected with the output of the DC—DC converting circuit while the other end being grounded.

11. A discharge lamp lighting circuit as claimed in claim 8, wherein said current auxiliary circuit further includes a resistor having one of ends connected to the output of the DC—DC converting circuit and the other end grounded through a series circuit of the capacitor and second resistor, and a diode connected in parallel with the second resistor.

12. A discharge lamp lighting circuit as claimed in claim 8, wherein one end of a primary winding of the transformer is connected to a DC input terminal of the DC—DC converting circuit to input an input voltage while the other end of the primary winding is grounded through the switching element, a control signal is supplied from the control circuit to a control terminal of the switching element.

13. A discharge lamp lighting circuit as claimed in claim 12, a resistor for current detection is provided between the ground and the switching element.

14. A discharge lamp lighting circuit as claimed in claim 8, wherein said DC—DC converting circuit has two transformers, one ends of primary windings of the two transformers are connected to a DC input terminal of the DC—DC converting circuit while the other ends of the primary windings are respectively grounded through the switching elements, control signals are respectively supplied from the control circuit to control terminals of the switching elements.

* * * * *